United States Patent
Li et al.

(10) Patent No.: US 12,347,461 B2
(45) Date of Patent: Jul. 1, 2025

(54) VIDEO GENERATION METHOD, APPARATUS, DEVICE, AND STORAGE MEDIUM

(71) Applicant: Beijing Zitiao Network Technology Co., Ltd., Beijing (CN)

(72) Inventors: Xinwei Li, Beijing (CN); Jianfan Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/528,723

(22) Filed: Dec. 4, 2023

(65) Prior Publication Data

US 2024/0105233 A1    Mar. 28, 2024

Related U.S. Application Data

(63) Continuation of application No. PCT/CN2022/097059, filed on Jun. 6, 2022.

(30) Foreign Application Priority Data

Jun. 4, 2021 (CN) .......................... 202110624616.6

(51) Int. Cl.
    *G11B 27/031* (2006.01)
(52) U.S. Cl.
    CPC ................... *G11B 27/031* (2013.01)
(58) Field of Classification Search
    CPC .................................................. G11B 27/031
    See application file for complete search history.

(56) References Cited

U.S. PATENT DOCUMENTS 11,856,286 B2    12/2023  Li et al.
2004/0071441 A1*  4/2004  Foreman .............. G06F 3/0483
                                                    386/280

(Continued)

FOREIGN PATENT DOCUMENTS

CN    103839562 A    6/2014
CN    104349175 A    2/2015

(Continued)

OTHER PUBLICATIONS

Liu Quan, TV News Camera, published by China Radio and Television Society, Jan. 31, 2014, with partial English translation (8 pages).

(Continued)

*Primary Examiner* — Mishawn N. Hunter

(57) ABSTRACT

The present disclosure provides a video generation method, an apparatus, a device, and a storage medium, and the method includes: displaying shooting indication information of storyboard shots corresponding to a target video editing template in response to a trigger operation for the target video editing template, the shooting indication information being configured to indicate shooting modes and/or shooting content features corresponding to the storyboard shots; acquiring user material for the storyboard shots corresponding to the target video editing template, respectively; and generating a target result video corresponding to the target video editing template according to the user material respectively corresponding to the storyboard shots.

20 Claims, 7 Drawing Sheets

---

Displaying shooting indication information of storyboard shots corresponding to a target video editing template in response to a preset trigger operation for the target video editing template;    S101

Acquiring user material for the storyboard shots corresponding to the target video editing template, respectively;    S102

Generating a target result video corresponding to the target video editing template according to the user material respectively corresponding to the storyboard shots.    S103

(56) References Cited

U.S. PATENT DOCUMENTS

| | | | | |
|---|---|---|---|---|
| 2008/0007567 | A1* | 1/2008 | Clatworthy | G06T 15/00 |
| | | | | 345/619 |
| 2009/0110372 | A1* | 4/2009 | Morioka | G11B 27/105 |
| | | | | 386/242 |
| 2009/0198719 | A1* | 8/2009 | DeWitt | G06F 16/78 |
| | | | | 707/999.102 |
| 2011/0102424 | A1* | 5/2011 | Hibbert | G06T 15/02 |
| | | | | 345/419 |
| 2013/0343729 | A1* | 12/2013 | Rav-Acha | G06F 16/532 |
| | | | | 386/285 |
| 2015/0302893 | A1* | 10/2015 | Shannon | G11B 27/34 |
| | | | | 386/239 |
| 2017/0062009 | A1* | 3/2017 | Clifton | G11B 27/031 |
| 2018/0268565 | A1* | 9/2018 | Dolin | G06T 7/70 |
| 2019/0107927 | A1* | 4/2019 | Schriber | G06F 40/30 |
| 2019/0208287 | A1* | 7/2019 | Newell | H04N 21/854 |
| 2023/0353844 | A1 | 11/2023 | Li et al. | |

FOREIGN PATENT DOCUMENTS

| | | | |
|---|---|---|---|
| CN | 109495684 | A | 3/2019 |
| CN | 110139159 | A | 8/2019 |
| CN | 111601039 | A | 8/2020 |
| CN | 111726536 | A | 9/2020 |
| CN | 112422831 | A | 2/2021 |
| CN | 112672061 | A | 4/2021 |
| CN | 112866796 | A | 5/2021 |
| CN | 112887584 | A | 6/2021 |
| CN | 115442538 | A | 12/2022 |
| JP | 2005026752 | A | 1/2005 |
| JP | 2006332789 | A | 12/2006 |
| JP | 2015115718 | A | 6/2015 |
| TW | 201539101 | A | 10/2015 |

OTHER PUBLICATIONS

European Search Report for EP Patent Application No. 22815389.6, Issued on Oct. 16, 2024, 11 pages.
Communication Pursuant to Rules 70(2) and 70a(2) EPC for European Application No. 22815389.6, mailed Nov. 6, 2024, 1 page.
International Search Report and Written Opinion for International Application No. PCT/CN2022/097059, mailed Aug. 22, 2022, 12 Pages.
Notice of Reasons for Refusal for Japanese Application No. 2023-574742, mailed Feb. 25, 2025, 10 pages.

* cited by examiner

VIDEO GENERATION METHOD, APPARATUS, DEVICE, AND STORAGE MEDIUM

CROSS-REFERENCE TO RELATED APPLICATION

This application is a continuation of International Application No. PCT/CN2022/097059 filed on Jun. 6, 2022, which claims the priority to and benefits of Chinese Patent Application No. 202110624616.6, filed on Jun. 4, 2021. All the aforementioned patent applications are hereby incorporated by reference in their entireties.

TECHNICAL FIELD

The present disclosure relates to the field of data processing and, in particular, to a video generation method, an apparatus, a device, and a storage medium.

BACKGROUND

With the continuous development of video processing technology, people have more and more requirements for video generation methods. Therefore, how to enrich video generation methods to meet users' growing video editing needs and improve user experience is an urgent technical issue that needs to be solved.

SUMMARY

In order to solve the above technical problems or at least partially solve the above technical problems, the embodiments of the present disclosure provide a video generation method that is capable of utilizing the shooting indication information of respective storyboard shots in a target video editing template to indicate the acquisition of user material, and then generating a target result video according to the acquired user material, which enriches the way of generating the video and improves the user experience.

In a first aspect, the present disclosure provides a video generation method, comprising: displaying shooting indication information of storyboard shots corresponding to a target video editing template in response to a preset trigger operation for the target video editing template, wherein the shooting indication information is configured to indicate shooting modes and/or shooting content features corresponding to the storyboard shots; acquiring user material for the storyboard shots corresponding to the target video editing template, respectively; and generating a target result video corresponding to the target video editing template according to the user material respectively corresponding to the storyboard shots.

In an alternative embodiment, the target video editing template is configured with a demo video, and displaying the shooting indication information of the storyboard shots corresponding to the target video editing template in response to the preset trigger operation for the target video editing template, comprises: displaying the shooting indication information of the storyboard shots corresponding to the target video editing template in response to a preset trigger operation for the demo video, wherein material of a storyboard shot comprised in the demo video conforms to the shooting indication information of the storyboard shot.

In an alternative embodiment, the storyboard shots corresponding to the target video editing template have a corresponding relationship with a video clip, and displaying the shooting indication information of the storyboard shots corresponding to the target video editing template in response to the preset trigger operation for the target video editing template, comprises: displaying the shooting indication information of the storyboard shots corresponding to the target video editing template and material description information of the video clip, in response to the preset trigger operation for the target video editing template, wherein the material description information is configured to describe a video content feature corresponding to the video clip.

In an alternative embodiment, the target video editing template is configured with a content directory, the content directory comprises directory information corresponding to at least one video clip, and the directory information is configured to describe an overview of video content corresponding to the at least one video clip.

In an alternative embodiment, the method further comprises: in response to a trigger operation for a directory display control corresponding to the content directory, controlling the content directory to switch from a display state to a hidden state, or controlling the content directory to switch from the hidden state to the display state.

In an alternative embodiment, before generating a target result video corresponding to the target video editing template according to the user material respectively corresponding to the storyboard shots, the method further comprises: when receiving a shot adding operation for the storyboard shots corresponding to the target video editing template, acquiring a storyboard shot corresponding to the shot addition operation, and acquiring user material for the storyboard shot.

In an alternative embodiment, before generating the target result video corresponding to the target video editing template according to the user material respectively corresponding to the storyboard shot, the method further comprises: when receiving a deleting operation for a first storyboard shot among the storyboard shots corresponding to the target video editing template, deleting the first storyboard shot and user material corresponding to the first storyboard shot.

In an alternative embodiment, the method further comprises: in response to a preview operation for a second storyboard shot among the storyboard shots corresponding to the target video editing template, playing material corresponding to the second storyboard shot in the demo video, and displaying shooting indication information corresponding to the second storyboard shot.

In an alternative embodiment, acquiring the user material for the storyboard shots corresponding to the target video editing template, respectively, comprises: displaying a material adding page, wherein the shooting indication information of the storyboard shots corresponding to the target video editing template is displayed on the material adding page; and acquiring the user material for the storyboard shots corresponding to the target video editing template, respectively, based on the material adding page.

In an alternative embodiment, generating a target result video corresponding to the target video editing template according to the user material respectively corresponding to the storyboard shots, comprises: acquiring subtitles of the storyboard shots corresponding to the target video editing template; and generating the target result video corresponding to the target video editing template according to the user material and a subtitle respectively corresponding to the storyboard shots.

In a second aspect, the present disclosure provides a video generation apparatus, comprising: a first display module, configured to display shooting indication information of storyboard shots corresponding to a target video editing template in response to a preset trigger operation for the target video editing template, wherein the shooting indication information is configured to indicate shooting modes and/or shooting content features corresponding to the storyboard shots; a first acquisition module, configured to acquire user material for the storyboard shots corresponding to the target video editing template, respectively; and a first generation module, configured to generate a target result video corresponding to the target video editing template according to the user material respectively corresponding to the storyboard shots.

In a third aspect, the present disclosure provides a computer-readable storage medium, wherein instructions are stored in the computer-readable storage medium, and the instructions, when executed by a terminal device, cause the terminal device to implement the above method.

In a fourth aspect, the present disclosure provides a device, comprising: a memory, a processor, and a computer program stored on the memory and executable on the processor, wherein the processor, when executing the computer program, implements the above method.

In a fifth aspect, the present disclosure provides a computer program product, comprising a computer program/instruction, wherein the computer program/instruction, when executed by a processor, implements the above method.

Compared with the prior art, the technical scheme provided by the embodiment of the present disclosure has the following advantages:

The video generation method provided by the embodiments of the present disclosure includes: when receiving a preset trigger operation for a target video editing template, first displaying shooting indication information of storyboard shots corresponding to the target video editing template, in which the shooting indication information is configured to indicate shooting modes and/or shooting content features corresponding to the storyboard shots; then, acquiring user material for respective storyboard shots, respectively, and generating a target result video corresponding to the target video editing template according to acquired user material. The embodiments of the present disclosure are capable of utilizing the shooting indication information of respective storyboard shots in the target video editing template to indicate the acquisition of user material, and then generating the target result video according to the acquired user material, which enriches the way of generating the video and improves the user experience.

BRIEF DESCRIPTION OF DRAWINGS

The drawings herein are incorporated into and form a part of the specification, illustrate the embodiments consistent with the present disclosure, and are used in conjunction with the specification to explain the principles of the present disclosure.

In order to more clearly illustrate the technical solutions in the embodiments of the present disclosure or in prior art, the drawings to be used in the description of the embodiments or prior art will be briefly described below, and it will be obvious to those ordinarily skilled in the art that other drawings can be obtained on the basis of these drawings without inventive work.

DETAILED DESCRIPTION

In order to understand the above objects, features and advantages of the present disclosure more clearly, the solutions of the present disclosure will be further described below. It should be noted that, in case of no conflict, the features in one embodiment or in different embodiments can be combined.

Many specific details are set forth in the following description to fully understand the present disclosure, but the present disclosure can also be implemented in other ways different from those described here; obviously, the embodiments in the specification are a part but not all of the embodiments of the present disclosure.

In order to enrich the way of generating the video and improve user experience, the embodiments of the present disclosure provide a video generation method. Specifically, the video generation method includes: when receiving a preset trigger operation for a target video editing template, first displaying shooting indication information of storyboard shots corresponding to the target video editing template, in which the shooting indication information is configured to indicate shooting modes and/or shooting content features corresponding to the storyboard shots; then, acquiring user material for respective storyboard shots corresponding to the target video editing template, respectively, and generating a target result video corresponding to the target video editing template according to acquired user material. The embodiments of the present disclosure are capable of utilizing the shooting indication information of respective storyboard shots in the target video editing template to indicate the acquisition of user material, and then generating the target result video according to the acquired user material, which enriches the way of generating the video and improves the user experience.

Figure 1:
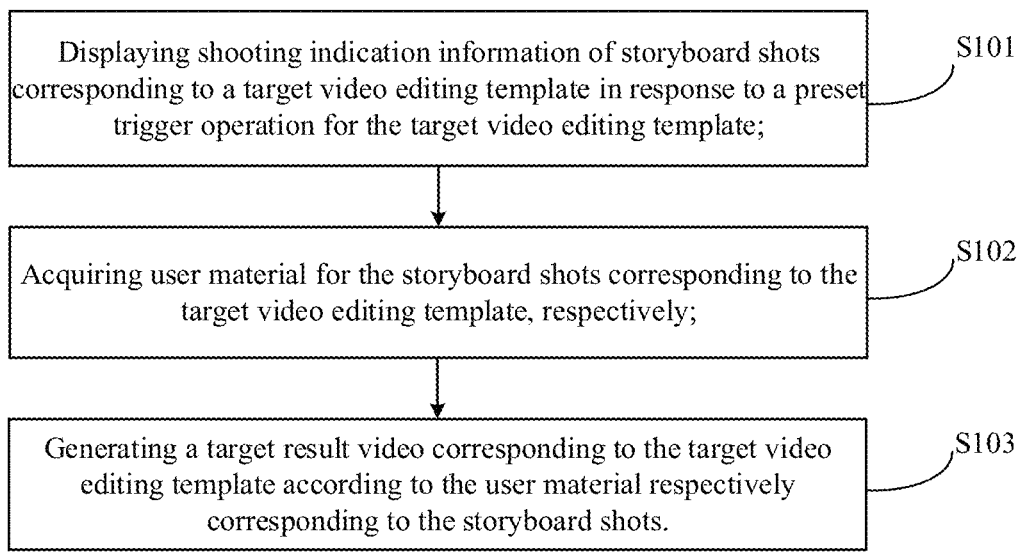
FIG. 1 a flowchart of a video generation method provided by at least one embodiment of the present disclosure.

Based on this, at least one embodiment of the present disclosure provides a video generation method. FIG. 1 is a flowchart of a video generation method provided by at least one embodiment of the present disclosure, and the method includes the following steps.

S101: displaying shooting indication information of storyboard shots corresponding to a target video editing template in response to a preset trigger operation for the target video editing template.

For example, the shooting indication information is configured to indicate shooting modes and/or shooting content features corresponding to the storyboard shots.

In the embodiments of the present disclosure, the target video editing template is preconfigured with a corresponding relationship between the storyboard shots and the shooting indication information, and the target video editing template may be any type of video editing template, such as a template for cutting the same style, etc.

In the embodiments of the present disclosure, when the preset trigger operation for the target video editing template is received, the shooting indication information of the storyboard shots corresponding to the target video editing template is displayed. Specifically, the shooting indication information is configured to indicate the shooting mode and/or shooting content features of the corresponding storyboard shots.

In an optional implementation, the shooting indication information has a one-to-one corresponding relationship with the storyboard shots, and the shooting indication information of each storyboard shot is configured to indicate the shooting mode, shooting content features, etc. of the storyboard shot. For example, the shooting mode may include a camera movement mode, specifically, the camera movement mode may include hand-held selfie, move left and right, follow-up shooting, etc., and the shooting indication information may further describe the shooting content features of the storyboard shot. For example, the shooting indication information may include "order food", and the material for describing the storyboard shot corresponding to the shooting indication information is content related to "order food".

In addition, the preset trigger operation for the target video editing template may be any preset trigger operation, such as a trigger operation for an editing control corresponding to the target video editing template.

In an optional implementation, the storyboard shots corresponding to the target video editing template may have a corresponding relationship with a video clip. When receiving the preset trigger operation for the target video editing template, not only the shooting indication information of the storyboard shots corresponding to the target video editing template may be displayed, but also material description information of respective video clips may be displayed. The material description information is configured to describe the video content features of a corresponding video clip.

Figure 2:
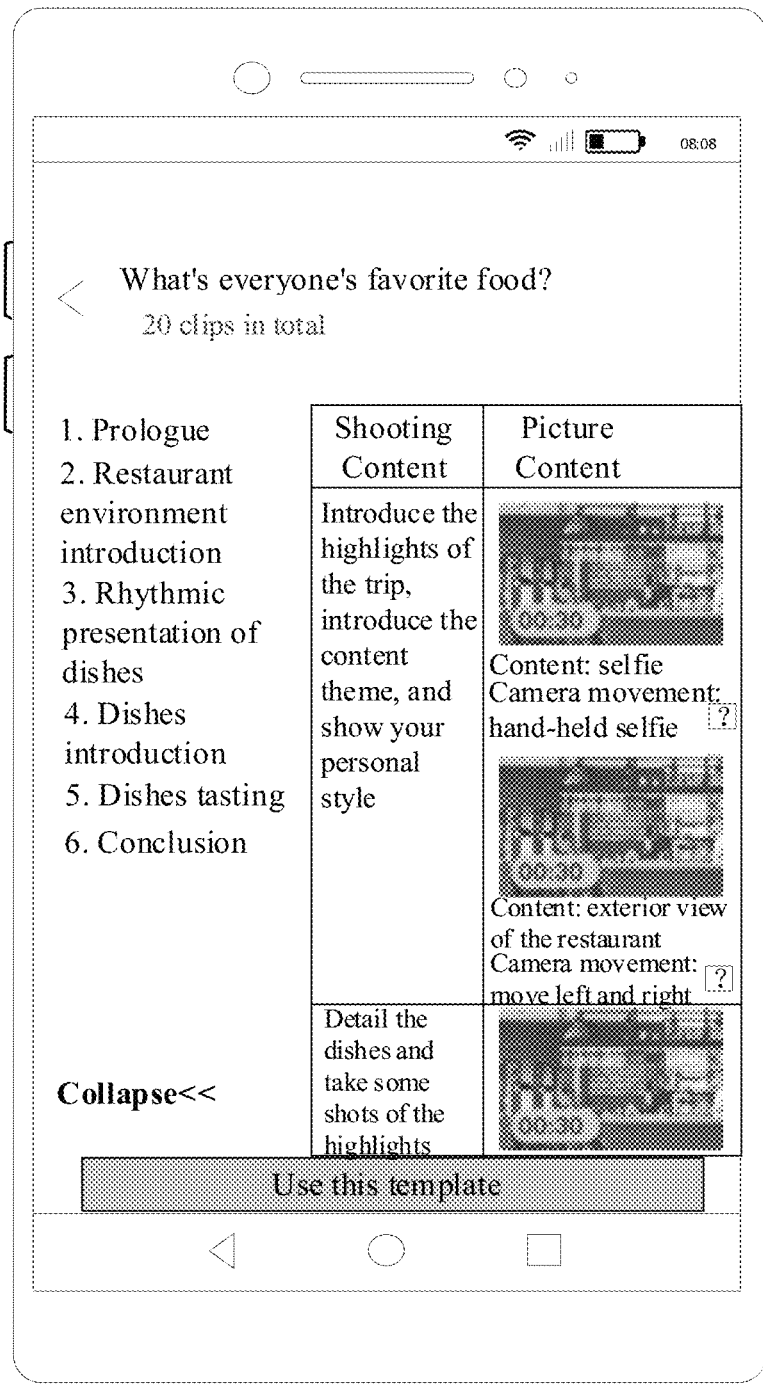
FIG. 2 is a schematic diagram of a shooting indication page provided by at least one embodiment of the present disclosure.

In an optional implementation, when receiving the preset trigger operation for the target video editing template, a shooting indication page is displayed, and FIG. 2 is a schematic diagram of a shooting indication page provided by at least one embodiment of the present disclosure. For example, the material description information of the video clip corresponding to the target video editing template is displayed on the shooting indication page, as illustrated in a column of "shooting content" in FIG. 2, and the shooting indication information of the storyboard shot corresponding to each video clip is displayed, as illustrated in a column of "picture content" in FIG. 2. For example, the shooting indication information of the storyboard shot includes content and camera movement, the content refers to the shooting content features corresponding to the storyboard shot, and the camera movement refers to the shooting mode corresponding to the storyboard shot.

In an optional implementation, a video tutorial is provided for the "camera movement" in FIG. 2, and the video tutorial is configured to guide the implementation process of the shooting mode indicated by the corresponding "camera movement". The corresponding video tutorial is played by clicking a video tutorial control corresponding to the "camera movement" in FIG. 2.

In addition, in order to enable the user to understand the content of the target video editing template as a whole, the target video editing template in the embodiments of the present disclosure may further be configured with a content directory, each piece of directory information in the content directory has a corresponding relationship with at least one video clip, and the piece of directory information is configured to describe an overview of the video content of the at least one video clip with which it corresponds. As illustrated on the left side of FIG. 2, the content directory includes six pieces of directory information, and the first piece of directory information is "prologue", which has a corresponding relationship with a first video clip and is used to describe an overview of video content of the first video clip, that is, the video content in the first video clip is the prologue. In an optional implementation, the content directory has a collapse and hiding function. Specifically, when a trigger operation for a directory display control corresponding to the content directory is received, the content directory is controlled to switch from a display state to a hidden state, or the content directory is controlled to switch from the hidden state to the display state.

As illustrated in FIG. 2, a "collapse" control in the lower left corner is the directory display control, and the current state of the content directory can be switched to the hidden state by clicking the "collapse" control. When the content directory is in the hidden state, the current state of the content directory can be switched to the display state by clicking the directory display control.

S102: acquiring user material for the storyboard shots corresponding to the target video editing template, respectively.

In the embodiments of the present disclosure, after the shooting indication information of the storyboard shots corresponding to the target video editing template is displayed to the user, corresponding user material is acquired for respective storyboard shots corresponding to the target video editing template, respectively.

In an optional implementation, a material adding page is first displayed, in which the shooting indication information of the storyboard shots corresponding to the target video editing template is displayed on the material adding page. Then, the user material is acquired for the storyboard shots corresponding to the target video editing template, respectively, based on the material adding page.

Figure 3:
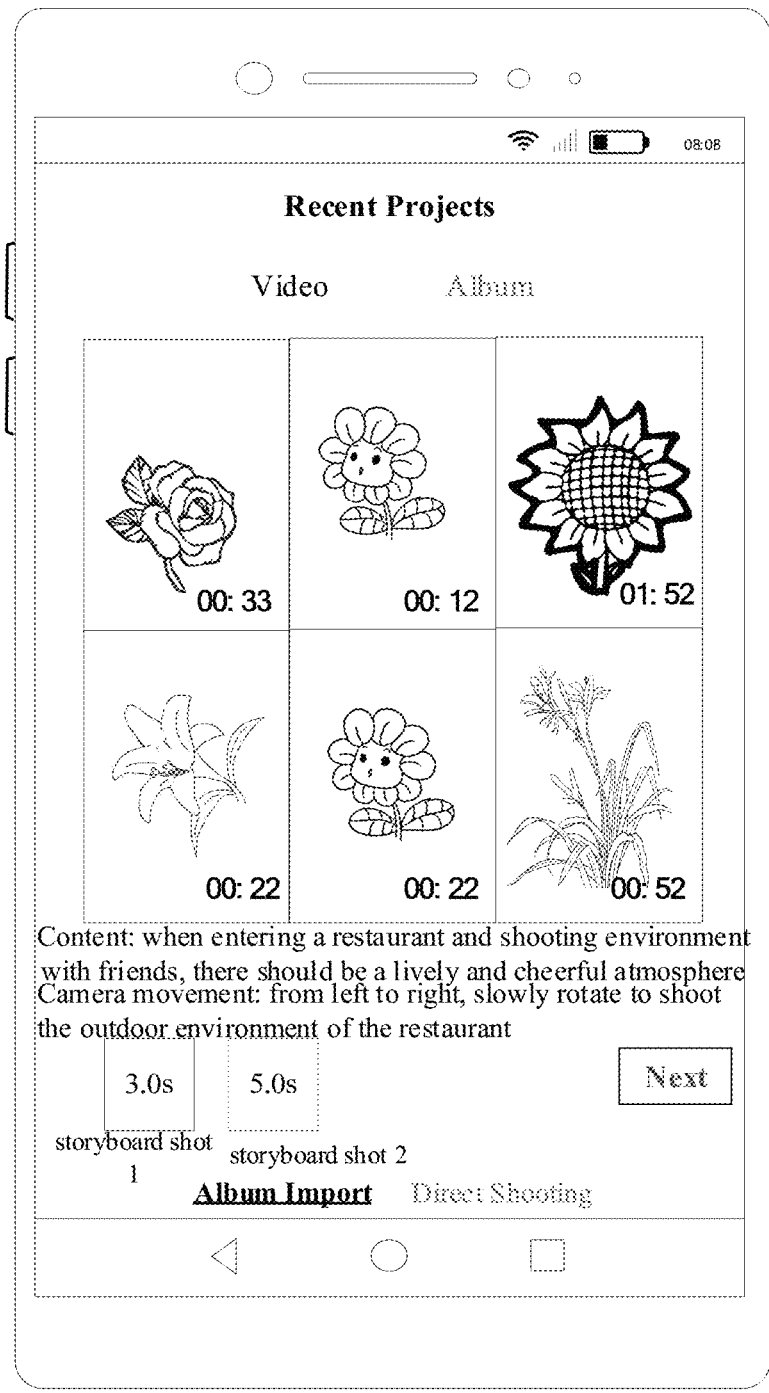
FIG. 3 is a schematic diagram of a material adding page provided by at least one embodiment of the present disclosure.

FIG. 3 is a schematic diagram of a material adding page provided by at least one embodiment of the present disclosure. Specifically, after displaying the shooting indication information of the storyboard shots corresponding to the target video editing template, the material adding page is displayed. The shooting indication information of respective storyboard shots are displayed on the material adding page. Specifically, a storyboard shot has a linkage relationship with a corresponding shooting indication information, and when a storyboard shot is selected, its corresponding shooting indication information is displayed on the material adding page. As illustrated in FIG. 3, the first storyboard shot is selected, and in this case, the shooting indication information corresponding to the first storyboard shot is displayed on the material adding page.

The user material is respectively determined for respective storyboard shots displayed on the material addition page. Specifically, the material adding page includes an album import page and a shooting page. In an optional implementation, the corresponding user material can be directly selected from the album import page based on the shooting indication information of the storyboard shots; and in another optional implementation, based on the shooting indication information of the storyboard shots, the user material can also be obtained based on the shooting of the shooting page.

S103: generating a target result video corresponding to the target video editing template according to the user material respectively corresponding to the storyboard shots. In the embodiments of the present disclosure, after acquiring the user material of the storyboard shots corresponding to the target video editing template, the target result video is generated based on the user material corresponding to respective storyboard shots. In practical applications, the user material respectively corresponding to respective storyboard shots can be synthesized according to the sequence of respective storyboard shots in the target video editing template to generate the target result video.

In an optional implementation, in order to further enrich the way of editing the video, the embodiments of the present disclosure may further add subtitles to respective storyboard shots corresponding to the target video editing template. As illustrated in FIG. 2, the column of "subtitles" is configured to add subtitles to respective storyboard shots. After acquiring the user material and subtitles corresponding to respective storyboard shots, the target result video is generated according to the user material and subtitles corresponding to respective storyboard shots.

The video generation method provided by the embodiments of the present disclosure includes: when receiving a preset trigger operation for a target video editing template, first displaying shooting indication information of storyboard shots corresponding to the target video editing template, in which the shooting indication information is configured to indicate shooting modes and/or shooting content features corresponding to the storyboard shots; then, acquiring user material for respective storyboard shots, respectively, and generating a target result video corresponding to the target video editing template according to acquired user material. The embodiments of the present disclosure are capable of utilizing the shooting indication information of respective storyboard shots in the target video editing template to indicate the acquisition of user material, and then generating the target result video according to the acquired user material, which enriches the way of generating the video and improves the user experience.

Figure 4:
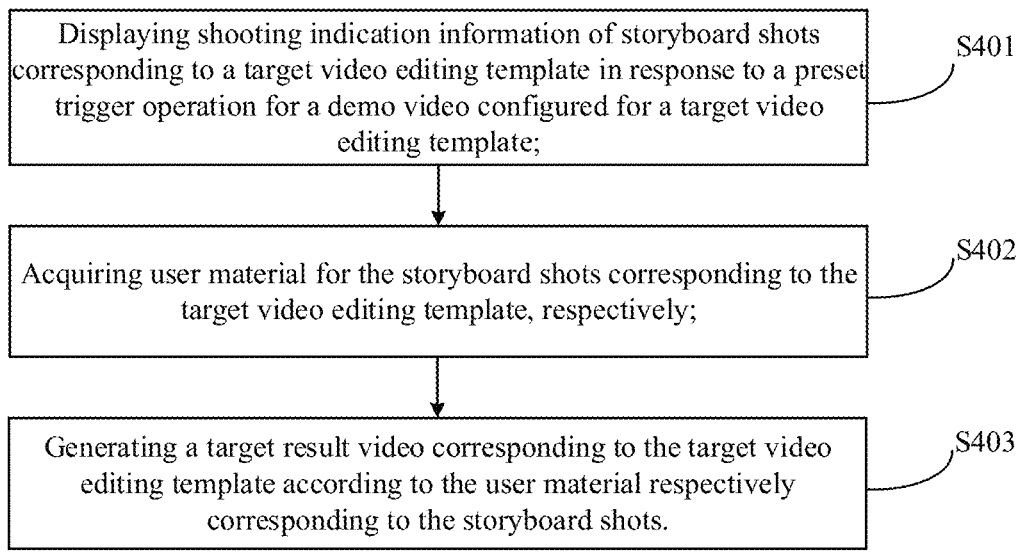
FIG. 4 a flowchart of another video generation method provided by at least one embodiment of the present disclosure.

Based on the above-mentioned embodiments, the present disclosure further provides a video generation method. FIG. 4 is a flowchart of another video generation method provided by at least one embodiment of the present disclosure, and the method includes the following steps.

S401: displaying shooting indication information of storyboard shots corresponding to a target video editing template in response to a preset trigger operation for a demo video configured for a target video editing template.

For example, the material of a storyboard shot included in the demo video conforms to the shooting indication information of the storyboard shot.

In the embodiments of the present disclosure, the target video editing template is configured with a demo video, and the material of a storyboard shot included in the demo video conforms to the shooting indication information of the storyboard shot corresponding to the target video editing template. When the preset trigger operation for the demo video is received, the shooting indication information of the storyboard shot corresponding to the target video editing template is displayed.

Figure 5:
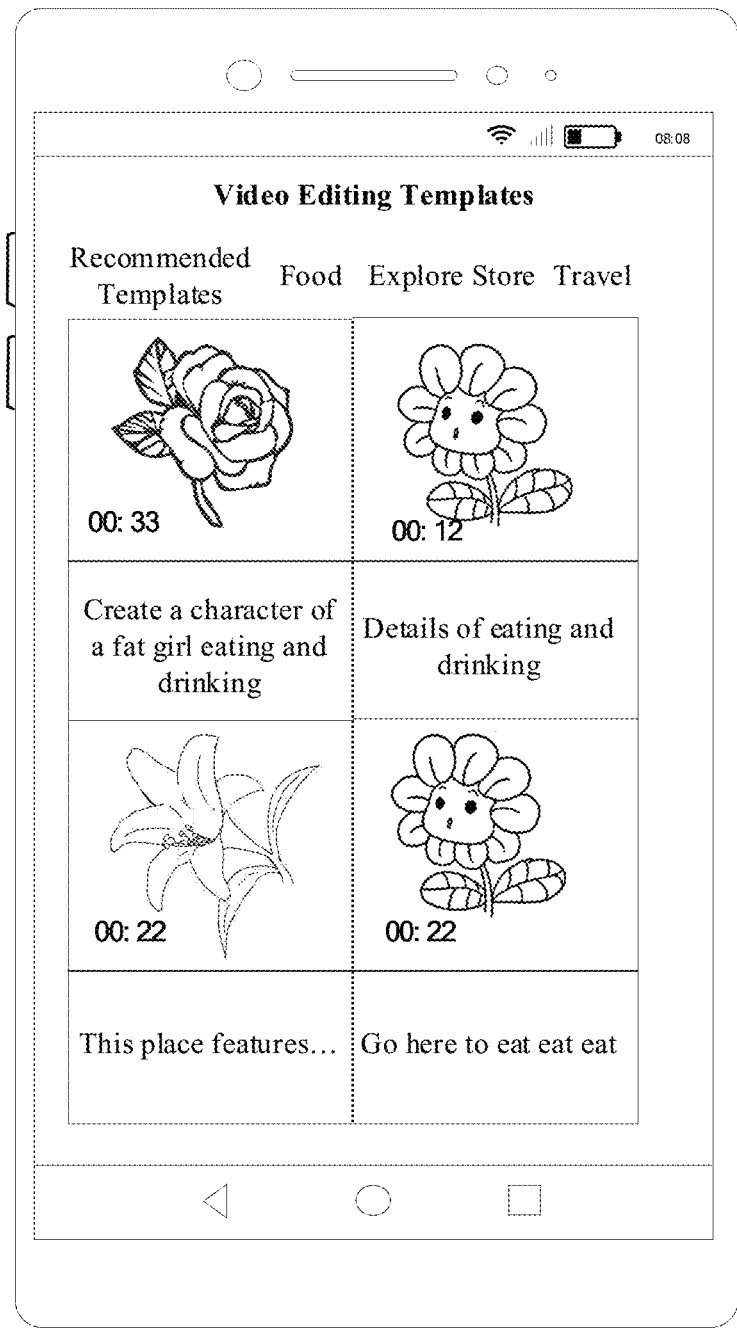
FIG. 5 is a schematic diagram of a template video recommendation page provided by at least one embodiment of the present disclosure.

In an optional implementation, any demo video is determined in a template video recommendation stream, as illustrated in FIG. 5, which is a schematic diagram of a template video recommendation page provided by at least one embodiment of the present disclosure, a demo video of a video editing template is displayed on the template video recommendation page for the user. When a preset trigger operation for any demo video is received, the template video recommendation page illustrated in FIG. 5 can be jumped to the shooting indication page illustrated in FIG. 2 mentioned above, and the shooting indication information of the storyboard shots of the target video editing template corresponding to the demo video is displayed on the shooting indication page.

In an optional implementation, covers of the material in the demo video corresponding to respective storyboard shots of the target video editing template may further be displayed on the shooting indication page. As illustrated in FIG. 2, information such as covers of the material, duration of the material, etc. corresponding to the storyboard shots is further displayed in the column of "picture content".

In addition, a "use this template" button may further be provided on the shooting indication page on which the shooting indication information corresponding to respective storyboard shots of the target video editing template is displayed, and as illustrated in FIG. 2 mentioned above, the shooting indication page can be jumped to the shooting editing page by the button. For example, the shooting editing page is configured to edit the user material respectively corresponding to respective storyboard shots of the target video editing template.

Figure 6:
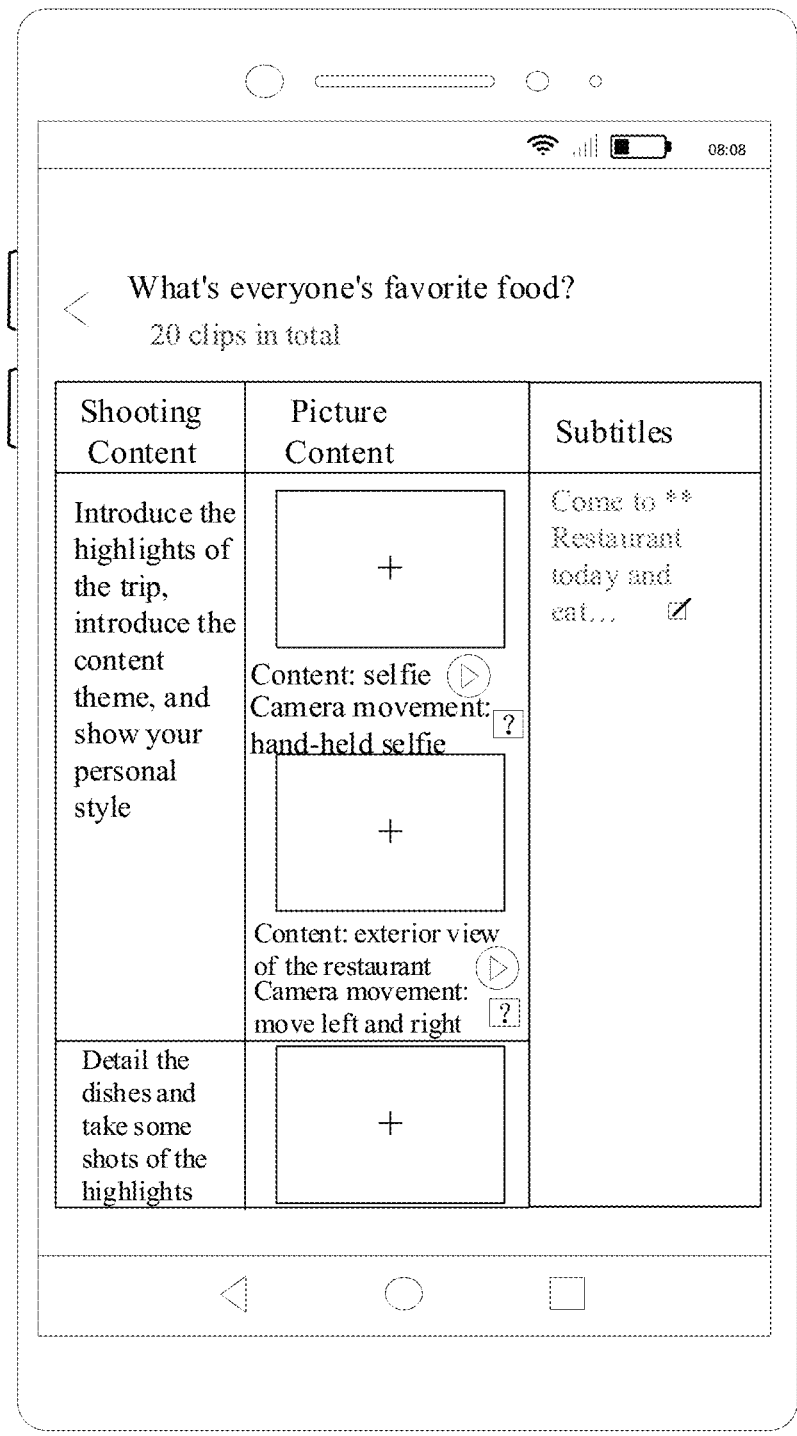
FIG. 6 is a schematic diagram of a shooting editing page provided by at least one embodiment of the present disclosure.

FIG. 6 is a schematic diagram of a shooting editing page provided by at least one embodiment of the present disclosure, for example, a material adding button is provided on the shooting editing page. In an optional implementation, each storyboard shot is provided with a corresponding material adding button, and after the user clicks the material adding button, the shooting editing page illustrated in FIG. 6 is jumped to the material adding page illustrated in FIG. 3 mentioned above.

In addition, the shooting editing page in FIG. 6 is further provided with a subtitle editing box, in which subtitles corresponding to respective storyboard shots can be input. In addition, a preview button may further be provided for respective storyboard shots on the shooting editing page in FIG. 6, and a preview operation can be triggered for a corresponding storyboard shot by clicking the preview button. Specifically, when a preview operation for a second storyboard shot is received, the material corresponding to the second storyboard shot in the demo video is played, and the shooting indication information corresponding to the second storyboard shot is displayed. The second storyboard shot may be any one of the storyboard shots corresponding to the target video editing template.

In an optional implementation, a shot adding operation or a shot deleting operation may further be triggered, on the shooting editing page illustrated in FIG. 6 mentioned above, for the storyboard shots.

Specifically, when a shot adding operation for a storyboard shot corresponding to the target video editing template is received, the storyboard shot corresponding to the shot adding operation is acquired, user material is acquired for the storyboard shot, and the acquired user material is used for the generation of the target result video.

When a deleting operation for the first storyboard shot among the storyboard shots corresponding to the target video editing template is received, the first storyboard shot and the user material corresponding to the first storyboard shot are deleted.

In the embodiments of the present disclosure, the storyboard shots can be added or deleted based on the storyboard shots in the target video editing template, so that the video generation method provided by the embodiments of the present disclosure can combine the target video editing template and user needs to generate the target result video, further enriching the way of generating the video and improving the user experience.

S402: acquiring user material for the storyboard shots corresponding to the target video editing template, respectively.

S403: generating a target result video corresponding to the target video editing template according to the user material respectively corresponding to the storyboard shots.

S402 and S403 in the embodiments of the present disclosure can be understood with reference to the description of S102 and S103 in the above-mentioned embodiments, and will not be described again here.

The video generation method provided by the embodiments of the present disclosure are capable of utilizing the shooting indication information of respective storyboard shots in the target video editing template to indicate the acquisition of user material, and then generating the target result video according to the acquired user material, which enriches the way of generating the video and improves the user experience.

Figure 7:
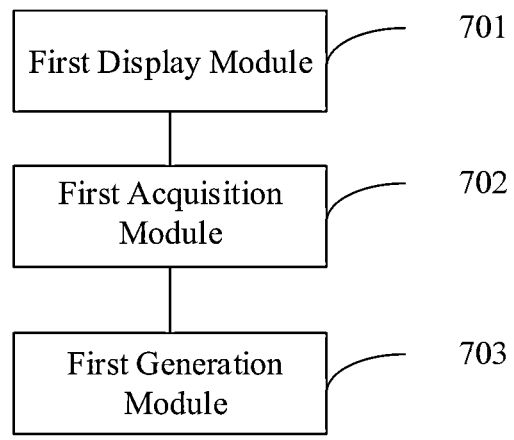
FIG. 7 is a schematic diagram of a structure of a video generation apparatus provided by at least one embodiment of the present disclosure.

The present disclosure further provides a video generation apparatus based on the same inventive concept as the above-mentioned method embodiments. FIG. 7 is a schematic diagram of a structure of a video generation apparatus provided by at least one embodiment of the present disclosure, and the apparatus includes a first display module 701, a first acquisition module 702, and a first generation module 703.

The first display module 701 is configured to display shooting indication information of storyboard shots corresponding to a target video editing template in response to a preset trigger operation for the target video editing template, and the shooting indication information is configured to indicate shooting modes and/or shooting content features corresponding to the storyboard shots.

The first acquisition module 702 is configured to acquire user material for the storyboard shots corresponding to the target video editing template, respectively.

The first generation module 703 is configured to generate a target result video corresponding to the target video editing template according to the user material respectively corresponding to the storyboard shots.

In an optional implementation, the first display module is specifically configured to display shooting indication information of the storyboard shots corresponding to the target video editing template in response to a preset trigger operation for a demo video, and material of a storyboard shot included in the demo video conforms to the shooting indication information of the storyboard shot.

In an optional implementation, the storyboard shots corresponding to the target video editing template have a corresponding relationship with a video clip, the first display module is specifically configured to display the shooting indication information of the storyboard shots corresponding to the target video editing template and material description information of the video clip, in response to the preset trigger operation for the target video editing template, and the material description information is configured to describe a video content feature corresponding to the video clip In an optional implementation, the target video editing template is configured with a content directory, the content directory includes directory information corresponding to at least one video clip, and the directory information is configured to describe an overview of video content corresponding to the at least one video clip.

In an optional implementation, the apparatus further includes a control module.

The control module is configured to, in response to a trigger operation for a directory display control corresponding to the content directory, control the content directory to switch from a display state to a hidden state, or control the content directory to switch from the hidden state to the display state.

In an optional implementation, the apparatus further includes a second acquisition module.

The second acquisition module is configured to, when receiving a shot adding operation for the storyboard shots corresponding to the target video editing template, acquire a storyboard shot corresponding to the shot addition operation, and acquire user material for the storyboard shot.

In an optional implementation, the apparatus further includes a deleting module.

The deleting module is configured to, when receiving a deleting operation for a first storyboard shot among the storyboard shots corresponding to the target video editing template, delete the first storyboard shot and user material corresponding to the first storyboard shot.

In an optional implementation, the apparatus further includes a preview module.

The preview module is configured to, in response to a preview operation for a second storyboard shot among the storyboard shots corresponding to the target video editing template, play material corresponding to the second storyboard shot in the demo video, and display shooting indication information corresponding to the second storyboard shot.

In an optional implementation, the first acquisition module includes a first display sub-module and a first acquisition sub-module.

The first display sub-module is configured to display a material adding page, and the shooting indication information of the storyboard shots corresponding to the target video editing template is displayed on the material adding page.

The first acquisition sub-module is configured to acquire the user material for the storyboard shots corresponding to the target video editing template, respectively, based on the material adding page.

In an optional implementation, the first generation module includes a second acquisition sub-module and a first generation sub-module.

The second acquisition sub-module is configured to acquire the subtitles of the storyboard shots corresponding to the target video editing template.

The first generation sub-module is configured to generate the target result video corresponding to the target video editing template according to the user material and a subtitle respectively corresponding to the storyboard shots.

In the video generation apparatus provided by the embodiments of the present disclosure, when a preset trigger operation for a target video editing template is received, shooting indication information of storyboard shots corresponding to the target video editing template is first displayed, and the shooting indication information is configured to indicate shooting modes and/or shooting content features corresponding to the storyboard shots; then, user material is acquired for respective storyboard shots, respectively, and a target result video corresponding to the target video editing template is generated according to acquired user material. The embodiments of the present disclosure are capable of utilizing the shooting indication information of respective storyboard shots in the target video editing template to indicate the acquisition of user material, and then generating the target result video according to the acquired user material, which enriches the way of generating the video and improves the user experience.

In addition to the above-mentioned methods and apparatuses, the embodiments of the present disclosure further provide a computer-readable storage medium. Instructions are stored in the computer-readable storage medium, and the instructions, when executed by a terminal device, cause the terminal device to implement the video generation method according to the embodiments of the present disclosure.

The embodiments of the present disclosure further provide a computer program product, including a computer program/instruction, and the computer program/instruction, when executed by a processor, implements the video generation method according to the embodiments of the present disclosure.

Figure 8:
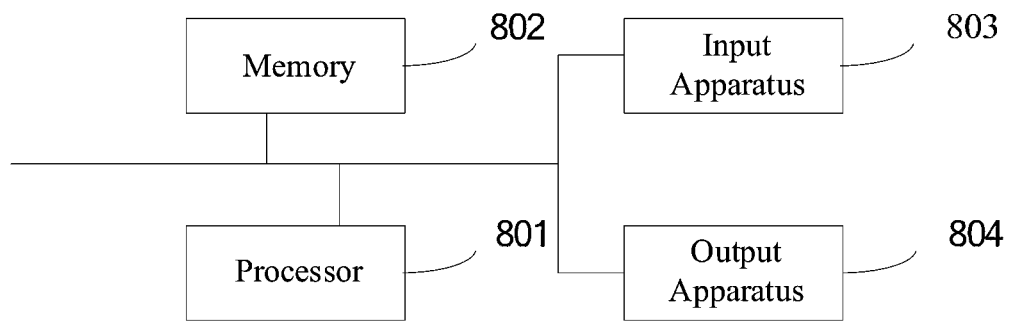
FIG. 8 is a schematic diagram of a structure of a video generation device provided by at least one embodiment of the present disclosure.

In addition, the embodiments of the present disclosure further provide a video generation device, as illustrated in FIG. 8, the video generation device may include a processor 801, a memory 802, an input apparatus 803, and an output apparatus 804.

The number of the processor 801 in the video generation device may be one or more, and one processor is taken as an example in FIG. 8. In some embodiments of the present disclosure, the processor 801, the memory 802, the input apparatus 803 and the output apparatus 804 may be connected through a bus or other means, and the connection through the bus is taken as an example in FIG. 8.

The memory 802 can be configured to store software programs and modules, and the processor 801 executes various functional applications and data processing of the video generation device by running the software programs and modules stored in the memory 802. The memory 802 may mainly include a program storage area and a data storage area, and the program storage area may store an operating system, at least one application program required for a function, and the like. In addition, the memory 802 may include high-speed random-access memory, and may also include non-volatile memory, such as at least one magnetic disk storage device, flash memory device, or other volatile solid-state storage device. The input apparatus 803 may be configured to receive input numeric or character information, and to generate signal input related to user settings and function control of the video generation device.

Specifically, in the present embodiment, the processor 801 can follow the following instructions to load the executable files corresponding to the processes of one or more application programs into the memory 802, and the processor 801 can run the applications stored in the memory 802 to realize the various functions of the above-mentioned video generation device.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. A video generation method, comprising:
displaying shooting indication information of storyboard shots corresponding to a target video editing template in response to a trigger operation for the target video editing template, wherein the shooting indication information is configured to indicate shooting modes and/or shooting content features corresponding to the storyboard shots;
acquiring user materials for the storyboard shots corresponding to the target video editing template, respectively; and
generating a target result video corresponding to the target video editing template according to the user materials respectively corresponding to the storyboard shots;
wherein acquiring the user materials for the storyboard shots corresponding to the target video editing template, respectively, comprises:
displaying a material adding page, wherein the shooting indication information of the storyboard shots corresponding to the target video editing template is displayed on the material adding page; and
acquiring the user materials for the storyboard shots corresponding to the target video editing template, respectively, based on the material adding page,
wherein the material adding page comprises an album import page and a shooting page, and acquiring the user materials for the storyboard shots corresponding to the target video editing template, respectively, based on the material adding page, comprises:
acquiring the user materials for the storyboard shots corresponding to the target video editing template, respectively, based on the album import page; and/or
acquiring the user materials for the storyboard shots corresponding to the target video editing template, respectively, based on the shooting page.

2. The method according to claim 1, wherein the target video editing template is configured with a demo video, and displaying the shooting indication information of the storyboard shots corresponding to the target video editing template in response to the trigger operation for the target video editing template, comprises:
displaying the shooting indication information of the storyboard shots corresponding to the target video editing template in response to a trigger operation for the demo video, wherein material of a storyboard shot comprised in the demo video conforms to the shooting indication information of the storyboard shot.

3. The method according to claim 2, further comprising:
in response to a preview operation for a second storyboard shot among the storyboard shots corresponding to the target video editing template, playing material corresponding to the second storyboard shot in the demo video, and displaying shooting indication information corresponding to the second storyboard shot.

4. The method according to claim 1, wherein the storyboard shots corresponding to the target video editing template have a corresponding relationship with a video clip, and displaying the shooting indication information of the storyboard shots corresponding to the target video editing template in response to the trigger operation for the target video editing template, comprises:
displaying the shooting indication information of the storyboard shots corresponding to the target video editing template and material description information of the video clip, in response to the trigger operation for the target video editing template, wherein the material description information is configured to describe a video content feature corresponding to the video clip.

5. The method according to claim 4, wherein the target video editing template is configured with a content directory, the content directory comprises directory information corresponding to at least one video clip, and the directory information is configured to describe an overview of video content corresponding to the at least one video clip.

6. The method according to claim 5, further comprising:
in response to a trigger operation for a directory display control corresponding to the content directory, controlling the content directory to switch from a display state to a hidden state, or controlling the content directory to switch from the hidden state to the display state.

7. The method according to claim 1, wherein before generating the target result video corresponding to the target video editing template according to the user materials respectively corresponding to the storyboard shots, the method further comprises:
when receiving a shot addition operation for the storyboard shots corresponding to the target video editing template, acquiring a storyboard shot corresponding to the shot addition operation, and acquiring user material for the storyboard shot.

8. The method according to claim 1, wherein before generating the target result video corresponding to the target video editing template according to the user materials respectively corresponding to the storyboard shots, the method further comprises:
when receiving a deleting operation for a first storyboard shot among the storyboard shots corresponding to the target video editing template, deleting the first storyboard shot and user material corresponding to the first storyboard shot.

9. The method according to claim 1, wherein generating the target result video corresponding to the target video editing template according to the user materials respectively corresponding to the storyboard shots, comprises:
acquiring subtitles of the storyboard shots corresponding to the target video editing template; and
generating the target result video corresponding to the target video editing template according to the user materials and the subtitles respectively corresponding to the storyboard shots.

10. A non-transitory computer-readable storage medium, wherein instructions are stored in the non-transitory computer-readable storage medium, and the instructions, when executed by a terminal device, cause the terminal device to implement a video generation method, which comprises:
displaying shooting indication information of storyboard shots corresponding to a target video editing template in response to a trigger operation for the target video editing template, wherein the shooting indication information is configured to indicate shooting modes and/or shooting content features corresponding to the storyboard shots;
acquiring user materials for the storyboard shots corresponding to the target video editing template, respectively; and
generating a target result video corresponding to the target video editing template according to the user materials respectively corresponding to the storyboard shots;
wherein when performing the step of acquiring the user materials for the storyboard shots corresponding to the target video editing template, respectively, the terminal device implements:
displaying a material adding page, wherein the shooting indication information of the storyboard shots corresponding to the target video editing template is displayed on the material adding page; and
acquiring the user materials for the storyboard shots corresponding to the target video editing template, respectively, based on the material adding page,
wherein the material adding page comprises an album import page and a shooting page, and when performing the step of acquiring the user materials for the storyboard shots corresponding to the target video editing template, respectively, based on the material adding page, the terminal device implements:
acquiring the user materials for the storyboard shots corresponding to the target video editing template, respectively, based on the album import page; and/or
acquiring the user materials for the storyboard shots corresponding to the target video editing template, respectively, based on the shooting page.

11. The non-transitory computer-readable storage medium according to claim 10, wherein the target video editing template is configured with a demo video, and displaying the shooting indication information of the storyboard shots corresponding to the target video editing template in response to the trigger operation for the target video editing template, comprises:
displaying the shooting indication information of the storyboard shots corresponding to the target video editing template in response to a trigger operation for the demo video, wherein material of a storyboard shot comprised in the demo video conforms to the shooting indication information of the storyboard shot.

12. A device, comprising:
a memory, a processor, and a computer program stored on the memory and executable on the processor, wherein the processor, when executing the computer program, implements a video generation method, which comprises:
displaying shooting indication information of storyboard shots corresponding to a target video editing template in response to a trigger operation for the target video editing template, wherein the shooting indication information is configured to indicate shooting modes and/or shooting content features corresponding to the storyboard shots;

acquiring user materials for the storyboard shots corresponding to the target video editing template, respectively; and generating a target result video corresponding to the target video editing template according to the user materials respectively corresponding to the storyboard shots;

wherein when performing the step of acquiring the user materials for the storyboard shots corresponding to the target video editing template, respectively, the processor implements:

displaying a material adding page, wherein the shooting indication information of the storyboard shots corresponding to the target video editing template is displayed on the material adding page; and acquiring the user materials for the storyboard shots corresponding to the target video editing template, respectively, based on the material adding page, wherein the material adding page comprises an album import page and a shooting page, and when performing the step of acquiring the user materials for the storyboard shots corresponding to the target video editing template, respectively, based on the material adding page, the processor implements:

acquiring the user materials for the storyboard shots corresponding to the target video editing template, respectively, based on the album import page; and/or acquiring the user materials for the storyboard shots corresponding to the target video editing template, respectively, based on the shooting page.

13. The device according to claim 12, wherein the target video editing template is configured with a demo video, and displaying the shooting indication information of the storyboard shots corresponding to the target video editing template in response to the trigger operation for the target video editing template, comprises:

displaying the shooting indication information of the storyboard shots corresponding to the target video editing template in response to a trigger operation for the demo video, wherein material of a storyboard shot comprised in the demo video conforms to the shooting indication information of the storyboard shot.

14. The device according to claim 13, wherein the method further comprises:

in response to a preview operation for a second storyboard shot among the storyboard shots corresponding to the target video editing template, playing material corresponding to the second storyboard shot in the demo video, and displaying shooting indication information corresponding to the second storyboard shot.

15. The device according to claim 12, wherein the storyboard shots corresponding to the target video editing template have a corresponding relationship with a video clip, and displaying the shooting indication information of the storyboard shots corresponding to the target video editing template in response to the trigger operation for the target video editing template, comprises:

displaying the shooting indication information of the storyboard shots corresponding to the target video editing template and material description information of the video clip, in response to the trigger operation for the target video editing template, wherein the material description information is configured to describe a video content feature corresponding to the video clip.

16. The device according to claim 15, wherein the target video editing template is configured with a content directory, the content directory comprises directory information corresponding to at least one video clip, and the directory information is configured to describe an overview of video content corresponding to the at least one video clip.

17. The device according to claim 16, wherein the method further comprises:

in response to a trigger operation for a directory display control corresponding to the content directory, controlling the content directory to switch from a display state to a hidden state, or controlling the content directory to switch from the hidden state to the display state.

18. The device according to claim 12, wherein before generating the target result video corresponding to the target video editing template according to the user materials respectively corresponding to the storyboard shots, the method further comprises:

when receiving a shot addition operation for the storyboard shots corresponding to the target video editing template, acquiring a storyboard shot corresponding to the shot addition operation, and acquiring user material for the storyboard shot.

19. The device according to claim 12, wherein before generating the target result video corresponding to the target video editing template according to the user materials respectively corresponding to the storyboard shots, the method further comprises:

when receiving a deleting operation for a first storyboard shot among the storyboard shots corresponding to the target video editing template, deleting the first storyboard shot and user material corresponding to the first storyboard shot.

20. The device according to claim 12, wherein generating the target result video corresponding to the target video editing template according to the user materials respectively corresponding to the storyboard shots, comprises:

acquiring subtitles of the storyboard shots corresponding to the target video editing template; and generating the target result video corresponding to the target video editing template according to the user materials and the subtitles respectively corresponding to the storyboard shots.

* * * * *